United States Patent [19]
Headley

[11] 3,734,752
[45] May 22, 1973

[54] PROCESSING CEREAL GRAINS AND SEEDS BY A SEMI-DRY MILLING METHOD

[75] Inventor: Verl E. Headley, Naperville, Ill.

[73] Assignee: CPC International Inc., Englewood Cliffs, N.J.

[22] Filed: Sept. 14, 1970

[21] Appl. No.: 72,061

[52] U.S. Cl..............................................99/233.3
[51] Int. Cl.................................................B02c 3/00
[58] Field of Search.......................146/221.8, 221.7, 146/231, 253, 279, 286, 288, 300

[56] References Cited
UNITED STATES PATENTS

| | | |
|---|---|---|
| 2,355,810 | 8/1944 | Loewy..............................146/253 X |
| 3,474,722 | 10/1969 | Watson et al..................146/221.8 X |

*Primary Examiner*—Willie G. Abercrombie
*Attorney*—Frank E. Robbins, John B. Goodman, Janet E. Price, Joseph Shekleton, Martha A. Michaels and Dorothy R. Thumbler

[57] ABSTRACT

Covers equipment and processes that are useful in degerminating or dehulling kernels of cereal and seeds. A preferred embodiment of the equipment has a frame on which a housing is mounted. A rotary assembly is mounted for rotation within a chamber in the housing. The rotary assembly consists of a vaned impeller that is disposed to confront a generally cylindrical impact surface in the housing chamber, and a rotor member that is secured below the impeller and that has a surface that is disposed in spaced relationship to the confronting surface of the housing chamber. These confronting surfaces define an annulus therebetween.

In operation of the equipment for processing material including kernels of cereal or seeds, the material is fed into a central portion of the impeller, accelerated by the impeller radially outwardly within the chamber to engage against the impact surface and to move along it, and then is immediately passed downward through the annular passage in a generally helical path.

For dehulling, the material is subjected to progressively milder abrading action as it passes through the annular passage, and then is discharged from the machine. For degerminating, the material is subjected to a series of impacts as it passes through the annular passage.

9 Claims, 13 Drawing Figures

Patented May 22, 1973 3,734,752

INVENTOR.
VERL E. HEADLEY
BY Frank E. Robbins
ATTORNEY

Patented May 22, 1973

INVENTOR.
VERL E. HEADLEY
BY Frank E. Robbins
ATTORNEY.

Patented May 22, 1973

INVENTOR
VERL E. HEADLEY
BY Frank E. Robbins
ATTORNEY

PROCESSING CEREAL GRAINS AND SEEDS BY A SEMI-DRY MILLING METHOD

FIELD OF THE INVENTION

This invention relates to equipment and processes that are useful for processing agricultural raw materials. More particularly, the equipment and processes are useful for dehulling or degerminating kernels of cereal and seeds, especially corn.

DESCRIPTION OF THE PRIOR ART

The corn wet milling process is designed to obtain practically complete separation of the pericarp, germ, and endosperm. It does so with a high degree of efficiency, permitting the recovery of oil and starch in highly purified form, along with other relatively minor and less valuable components.

However, while wet process mills are currently the largest corn processors, the wet milling process does have several disadvantages. For example, relatively high capital investment is required per unit of capacity. Moreover, the unit operations involved, such as the initial steeping operation, are by nature batch operations that are quite time consuming and hence, offer great potential for the introduction of more efficient processing methods.

There are two common dry milling methods. In the older method, the corn kernels are ground to a coarse meal between heavy millstones. The meal is a whole corn product and is therefore oily and subject to rapid deterioration. The newer dry milling process roughly separates the bran, germ, and endosperm, using a degerminator, a complicated system of steel rolls, and sizing and aspiration devices.

The newer dry milling process became practical as a mass production technique shortly after 1900, because of the development of a machine for cracking the kernel with less germ breakage than would be obtained in conventional grinding devices. However, even modern, currently available dry milling techniques do not achieve the efficient separation that is possible in the wet milling process, and the endosperm products (grits, meal and flour) that are obtained generally contain some fat and have a characteristic yellow color. The dry milling process is also quite complicated and involves several steps that are batch steps in nature.

Because of the inherent limitations of the wet milling and dry milling processes, many attempts have been made to improve them by the introduction of new operations such as, for example, impact milling. The difficulty in utilizing a great many prior art processes and apparatuses in attempting to dehull grains and seeds that have a protective outer coating and an inner, fragile portion, as by impact milling, lies in the fact that such treatment usually removes not only the outer covering or hull but also materially damages the inner, fragile portion, producing a mixture of hull, broken germ and endosperm. This mixture can be resolved only with much subsequent process difficulty. Thus, while dry milling of cereal grains and seeds to accomplish dehulling and degermination has been carried out with some degree of success, few if any prior art processes and apparatuses are available to carry out the dehulling and degermination as efficiently and cleanly as is desirable or to the desired relatively high degree.

In like manner, no single process or apparatus is available which will efficiently carry out degermination of several different cereal grains and seeds, utilizing the same equipment.

Moreover, the prolonged, but necessary, steeping or conditioning steps that are employed as the initial steps in the wet milling and dry milling processes, respectively, present a number of serious drawbacks. For example, the initial, long steeping step of the wet milling process tends to extract from the grain a number of useful substances such as minerals, protein, sugars, vitamins, and the like, that remain in the steepwater and thus are not retained in the parts of the product stream that are used for human consumption. Furthermore, grain steeped over a relatively long period of time becomes essentially devoid of indigenous antioxidants and rapidly becomes rancid when subsequently stored at room temperature for any extended period.

One aim of degerminating is to free the germ from the endosperm in such a manner that the recovered endosperm fraction is low in oil and free of pericarp fiber. In some prior art degermination processes, the degermination is carried out at grain moisture levels in the range from about 20 percent to about 25 percent (wet basis). This requires the subsequent use of driers to reduce the moisture level of the degerminated stock to a level of about 15 to 16 percent. This extra drying step is, of course, costly with respect to the overall degerminating process.

In many prior art processes, degerminating has resulted in fracturing of the germ, producing broken pieces or even fine fragments, with some rupturing of the oil-bearing cells. In addition to excessive germ fragmentation, in some instances the endosperm is released with attached germ fragments and gross amounts of endosperm fines. In essence, the majority of the prior art degerminating processes are deficient in that they result in reduced yields of germ oil and endosperm products, or in that the quality of the endosperm products is sacrificed for yield.

It would be particularly advantageous if a novel process of degerminating were known, whereby effective degermination could take place at relatively low moisture contents, say 14 to 16 percent. This would obviate the need for drying the stock following the degermination, thus permitting the stock to be metered directly to the dry milling separation equipment. It would be a further advance in the art if the greater part of the germ could be released intact from the endosperm at reduced grain moisture levels, promoting higher germ oil yields.

It would also be a substantial advance in the art if dehulling or degermination or both could be carried out in an efficient manner in a single piece of equipment.

It would be a further step forward in the art of processing cereal grains and oil seeds if a method were known which was adaptable to either dehulling or degerminating by adjusting only a certain few variables of the process. Such a versatile milling process would find ready acceptance in the industry.

OBJECTS OF THE INVENTION

It therefore is one object of the invention to provide new, practical processes and equipment that are useful and effective in processing agricultural raw materials, including cereal grains and oil-bearing seeds.

It is another object of the invention to provide practical new equipment and processes that are useful for both dehulling and degerminating cereal grain such as corn or sorghum and, as well, oil-bearing seeds such as sunflower seeds.

A further object of the invention is to provide a new method of dehulling in a unique apparatus whereby the amount of steeping prior to processing is minimal, obviating the disadvantages discussed above.

A still further object of the invention is to provide a new method of degermination utilizing a dry milling technique which eliminates the costly and somewhat deleterious step of steeping.

Another object of the invention is to provide a dry milling method of degermination whereby only relatively small amounts of moisture, if any, must be added, such as by soaking, prior to the dry milling step.

Other objects, features and advantages of the invention will be apparent hereinafter from the following description of certain preferred embodiments thereof, taken in conjunction with the accompanying drawings, and from the appended claims.

SUMMARY OF THE INVENTION

In accordance with the invention an apparatus has been discovered which is useful in degerminating and dehulling cereal grains and seeds. This apparatus broadly comprises, according to one preferred embodiment thereof, a frame holding a housing and a rotor that define a channel therebetween that has at least one rough surface, an impeller that is secured to the rotor, inlet means for the cereal grain or seed communicating with the impeller, and means for rotating the rotor, whereby, upon operation of the apparatus and rotation of the rotor and impeller, the grain or seed is accelerated by the impeller and driven against the inner wall of the housing, then spiralled downwardly through the channel for engagement with the rough surface, thereby to separate out at least one component of the grain or seed.

The invention is likewise concerned with methods of dehulling and degerminating. Either process step is broadly accomplished by utilizing the equipment to provide two successive zones of processing. The material is processed in the first zone by propelling it against and along the housing surface by means of the impeller, and then the processing is completed in a contiguous second zone, into which the material is immediately passed, and through which it passes in a downward, spiral path. The combined action in the two zones separates the material into its components or dehulls it, according to the mode of operation that is employed.

DETAILED DESCRIPTION OF THE DRAWINGS

Figure 1:
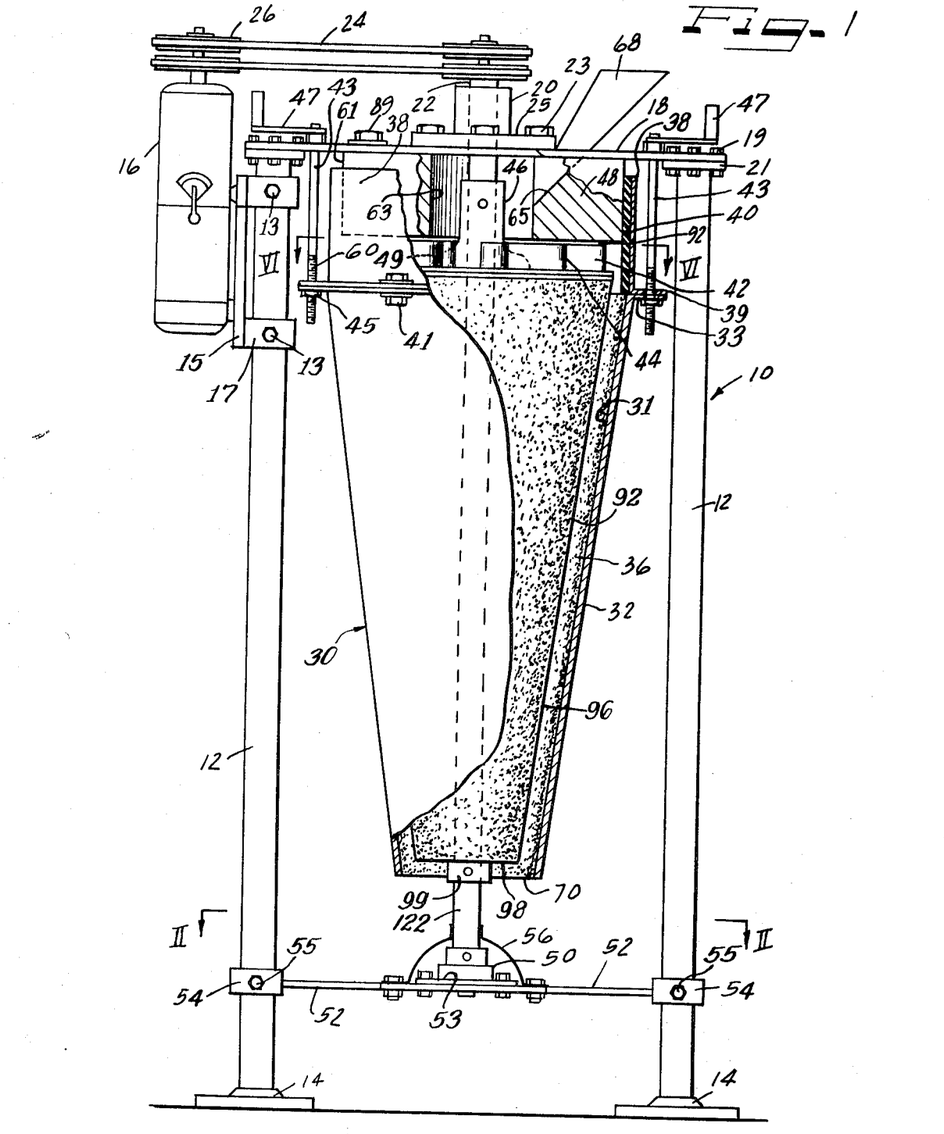
FIG. 1 is a side elevation, with some parts broken away, of an apparatus that is constructed in accordance with one preferred embodiment of the invention.

Referring now in detail to the drawings by numerals of reference, the numeral 10 in FIG. 1 denotes a frame. This frame 10 has four legs 12, only two of which are shown in FIG. 1. Each leg 12 is seated in its own base plate 14.

A variable speed motor 16 is mounted at one side of the frame 10, on a mounting bracket 15 that is formed with sleeves 17 that engage about one of the frame legs 12. The bracket 15 is secured to the leg by bolts 13 that seat in openings in the sleeves 17.

A platform 18 is secured to flanges 21 that are welded to the tops of the frame legs 12, by means of bolts 19. A bearing housing 20 is mounted on top of the platform 18. A shaft 22 is rotatably journalled in the housing 20 and is operatively connected to the variable speed motor 16 through drive belts 24 and sheaves 26.

A housing assembly 30 (FIG. 3) is suspended below the platform 18 in a manner to be described presently. This housing assembly 30 has a lower section 32 in the form of a cone frustum. This cone frustum 32 is open at its lower end. It is formed at its upper end with a radially outwardly extending flange 33. This flange 33 is formed with a plurality of angularly spaced holes or openings 34, for a purpose to be described presently. The inner surface of the cone frustum 32 is rough, that is, it may be, for example, covered with an abrasive coating 31, which may be provided in a variety of ways, including sprayed metal, silicon carbide grit, open weave wire mesh or small diameter rods that are welded in place, and the like, depending on the surface characteristics that are desired for operating, as will be made more clear presently.

Figures 2, 3:
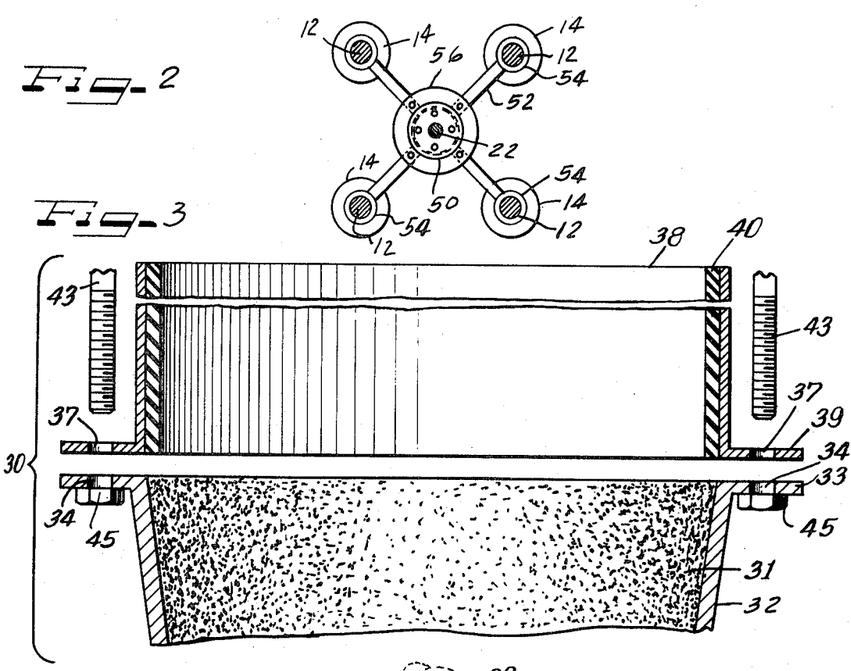
FIG. 2 is a section taken along the line II—II of FIG. 1, looking in the direction of the arrows.
FIG. 3 is a fragmentary, exploded view, on an enlarged scale of a subassembly of the housing, showing the cylindrical sleeve, a part of the stationary cone frustum that is shown spaced below the sleeve, and the nuts and bolts that secure them together.
Figure 6:
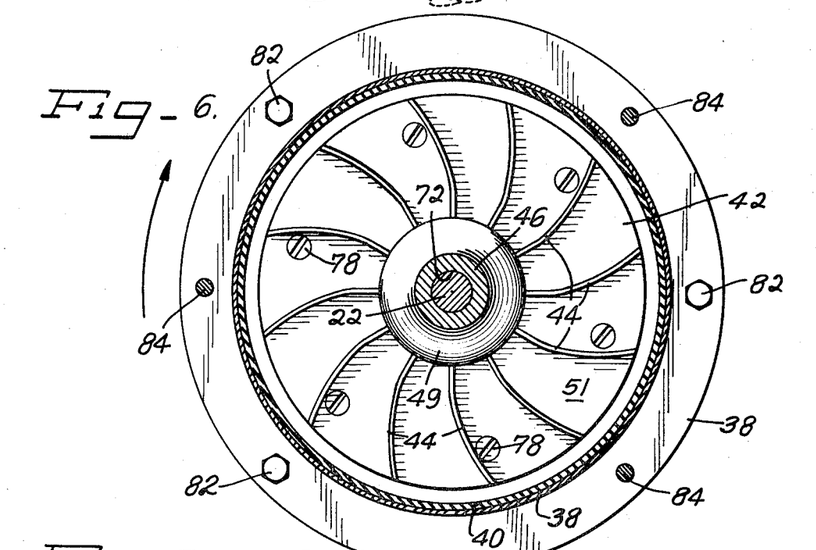
FIG. 6 is a section taken on the line VI—VI of FIG. 1, looking in the direction of the arrows, on an enlarged scale as to FIG. 1, but less enlarged than FIG. 3, with the direction of rotation of the rotary assembly, during operation, being indicated by the arrow.

The upper section of the housing assembly 30 is a generally cylindrical sleeve 38 (FIGS. 1, 3 and 6). This cylindrical sleeve 38 is provided on its inner surface with a hard rubber, metal, or similar lining 40, that presents a generally cylindrical internal surface. The sleeve 38 is formed at its lower end with a flange 39, that engages against and rests upon the flange 33 of the cone frustum 32. This flange 39 also is formed with a plurality of angularly spaced openings 37, that register with the openings 34 in the lower flange 33. The two flanges, 33 and 39 respectively, are fastened together by a plurality of nuts and bolts 41 (FIG. 1), and this assembly is suspended from the platform 18 on a pair of diametrically opposed shafts 43, that pass through aligned holes in the flanges 39 and 33 respectively, and whose lower ends are in threaded engagement with the nuts 45, that are welded or otherwise secured to the lower flange 33 (FIGS. 1 and 3). A pair of crank arms 47 are secured to the upper ends of the shafts 43, respectively, to facilitate rotation of the two shafts 43 to permit adjustment in the elevation of the housing assembly 30.

Figure 4:
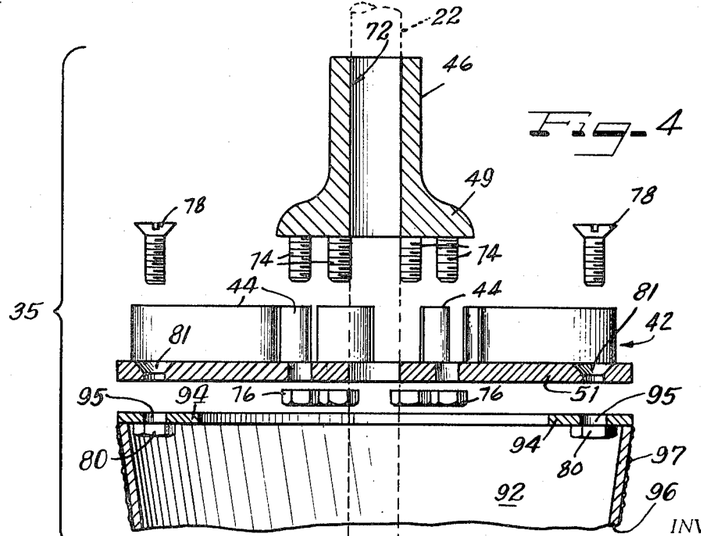
FIG. 4 is a fragmentary, exploded view, on the same enlarged scale, of the rotary assembly comprising a hub, an impeller, and the rotary cone frustum, with means for securing these parts together.
Figure 5:
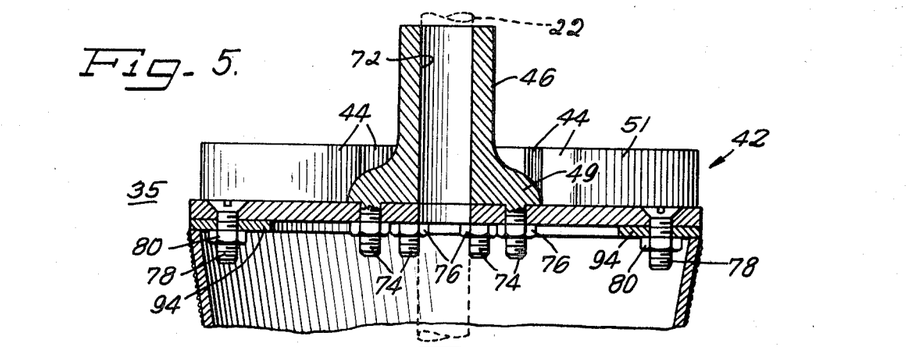
FIG. 5 is a fragmentary assembled view of the rotary assembly elements shown in FIG. 4, on the same scale as FIG. 4.

A rotary subassembly 35 is also suspended beneath the platform 18, for rotation within the chamber that is provided within the housing assembly 30. This rotary subassembly 35, as is best shown in FIGS. 1, 4, and 5, is secured to the shaft 22, for rotation upon rotation of the shaft. The uppermost part of the rotary subassembly 35 is a hub 46, that is formed with a bore 72 to receive the shaft 22, and that is keyed to the shaft 22, for rotation upon rotation of the shaft. The hub 46 is formed with a belled-out flange 49 at its lower end, from which several downwardly depending threaded members 74 project.

An impeller 42 is secured on the lower end of the hub 46. The impeller 42 consists of a web portion 51 and of a plurality of vanes 44 that are disposed in equiangularly spaced relation to each other, to project upwardly from the web, and that are welded or otherwise secured to the web at their lower ends. Each vane 44 has a proximal or inner end and a distal or outer end. The web portion 51 of the impeller is formed with a plurality of openings, in which the threaded members 74 of the hub are inserted and from which they project, to receive the nuts 76 that secure the impeller to the hub. As can best be seen in FIGS. 5 and 6, when the hub and impeller are assembled and secured together, there is no clearance space between the periphery of the hub and the proximal ends of the vanes.

The shape of the impeller vanes has been found to be important. As shown by the arrow in FIG. 6, the intended direction of rotation of the impeller, in operation of the device, is clockwise relative to FIG. 6. Each impeller vane 44 has the same curvature as the others. Between its inner end and its outer end, each vane is curved further and further away from a radius that might be drawn through the axis of rotation of the impeller and the proximal end point of the vane. Thus, each vane curves away from the direction of rotation of the impeller. It is greatly preferred that the impeller be so constructed that the path of a particle of the material that is being processed, upon leaving the impeller, be tangential with respect to the surface of the vane against which it has been engaged during its passage across the impeller.

It has been found that the curvature of each impeller vane is preferably a portion of a logarithmic spiral. It is believed that this curvature can be described by a mathematical formula as follows:

$$r = e^{a\theta}$$

where $r$ is the length of the radius vector, that is, $r$ is the straight line distance in a given transverse plane from the proximal end of an impeller vane to any point P on the vane; $\theta$ is the angle measured between a radius passing through the proximal point to the same point P; $e$ is the natural logarithmic base, 2.718, while $a$ is a constant whose value determines the curvature of the impeller. Thus, several different impeller paths (and paths of grain or seed distribution) can be obtained by changing the value of the constant $a$. Generally, impeller designs with $a$ values in the range from about 0.5 to about 10 are preferred, although the value of $a$ may approach infinity without greatly reducing the effectiveness of the impeller. When $a$ has the value of infinity, each impeller vane follows a straight line, radially extending path.

A third major component of the rotary assembly is the frustroconical member or rotor 92. As can be seen best in FIGS. 4 and 5, this rotor 92 is formed at its upper end with an inwardly directed flange or lip 94. This lip is formed with a plurality of openings 95, beneath each of which a nut 80 is welded or otherwise secured. The impeller web 51 is also formed with a plurality of countersunk openings 81, that can be placed in registry with the openings 95 in the lip 94. The appropriate number of bolts 78 are then passed through these pairs of registered openings 81 and 95, respectively, and threaded into the nuts 80, to secure the rotor 92 to the impeller 42.

The rotor 92 has a downwardly depending sidewall 96, of frustoconical shape. The surface of the sidewall is formed to be rough. It may be covered with an abrasive coating 97, or machined, or covered with open weave wire mesh, or with small size rods or bars that are welded in place, or the like.

The rough surface 97 of the rotor sidewall 96 is spaced from the rough surface 31 of the housing cone frustum 32, to provide therebetween a clearance channel 36 (FIG. 1). In the embodiment of the invention that is illustrated in FIG. 1, this clearance channel 36 is uniform in size throughout its extent. The slopes of both of the conical members are the same, and the clearance channel can be made wider or narrower by operating the cranks 47 to lower or to raise the housing assembly 30.

The rotor 92 is formed at its lower end with a transverse web portion 98 (FIG. 1), to which a collar 99 is secured. The collar 99 is secured to the lower end 122 of the shaft 22, that is journalled in a bearing housing 50 that is mounted on a plate 53 that is secured, in turn, to cross-braces 52 that extend between the lower ends of the legs 12 of the frame. Each of these cross-braces 52 is connected to its respective leg by a collar 54 that is adjustably secured to the leg by a set screw 55, to permit some adjustment in level. The bearing housing 50 is covered by a protective boot or dust cover 56.

Figure 7:
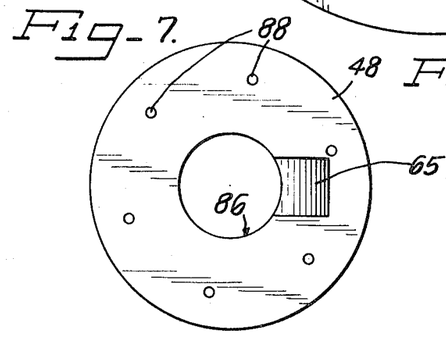
FIG. 7 is a top plan view of the upper plate element of the apparatus, on the same scale as FIG. 1.
Figure 8:
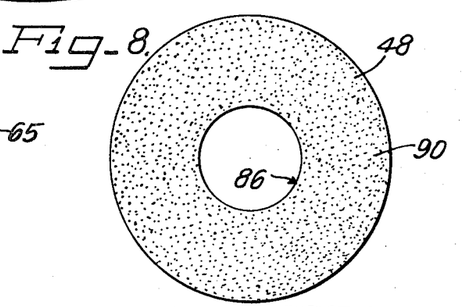
FIG. 8 is a bottom plan view of the upper plate element, on the same scale as FIG. 7, showing its abrasive surface.

An overhead plate 48 (FIGS. 1, 7 and 8) is secured to the lower face of the platform 18 by a plurality of bolts 89 that pass through openings (not shown) in the platform 18 and that are threaded into tapped holes 88 in the overhead plate.

The overhead plate 48 is formed with an outer, generally cylindrical surface 61 (FIG. 1), that engages snugly within the lining 40 of the cylindrical sleeve 38. The plate 48 also is formed with a generally cylindrical central bore 63, that is large enough in diameter to accommodate the passage therethrough of the hub 46, to facilitate assembly and disassembly of the equipment. The plate 48 also is formed with an oblique channel 65 therein, that communicates through an opening (not shown) in the platform 18 with the discharge opening of a chute 68, for supplying material to be processed to the equipment. The lower face 90 (FIG. 8) of the plate 48 is rough, like the confronting surfaces of the rotor and housing.

In the embodiments of the invention shown in FIGS. 9 through 13, the rotor and housing cone frustum are formed from open weave wire mesh. The wire mesh is oriented differently, however, for different purposes, as will now be described.

Figures 12, 13:
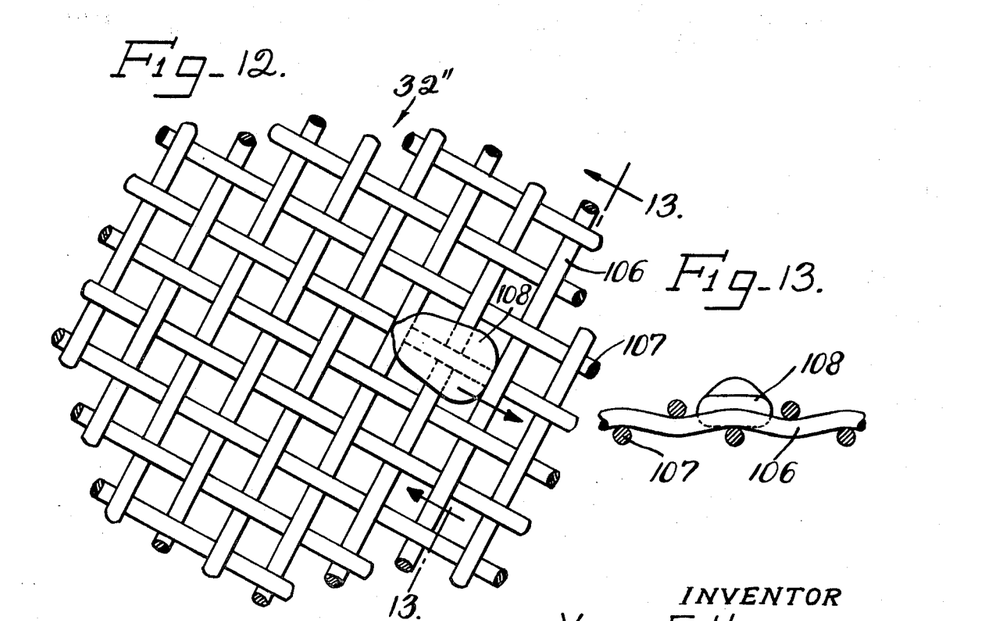
FIG. 12 is a fragmentary section, similar to that shown in FIG. 10, but showing a different disposition of the wire mesh, that is particularly suited for degermination.
FIG. 13 is a section taken on the line 13—13 of FIG. 12, looking in the direction of the arrows.

For degerminating, it is desirable to subject each kernel or seed to a series of impacts. For this purpose, a housing construction such as is shown in FIGS. 12 and 13 is preferred. Preferably, the kernel or seed is moistened before processing, to relieve brittleness of the pericarp. The impeller subjects the material to acceleration, distributes it about the impeller periphery, and causes it to impact against the liner of the cylindrical sleeve, and to slide over the surface of the sleeve liner 38 and then downwardly into the clearance channel between the rotor 92' and the cone frustum 32'' of the housing. The material spirals downwardly through the clearance channel, probably being primarily in contact with the housing 32'', but also making contact with the rotor 92', and being thrown by the rotor back to the housing.

In FIGS. 12 and 13, a kernel of corn 108 is shown as it moves through its downward, spiral path, engaged against the surface of the housing 32''. The housing 32'' is formed of one set of generally parallel heavy wires 106 that are woven into a mesh with a second set of generally parallel heavy wires 107. The wire bends are disposed so that the wires 107 exert a guiding action on the kernel, while the wires 106 project into the path of the kernel to expose it to successive impacts. The action is such as to shatter the kernel, while releasing the germ substantially intact. The housing wires are disposed in the same fashion as those of the rotor.

Figures 9, 10, 11:
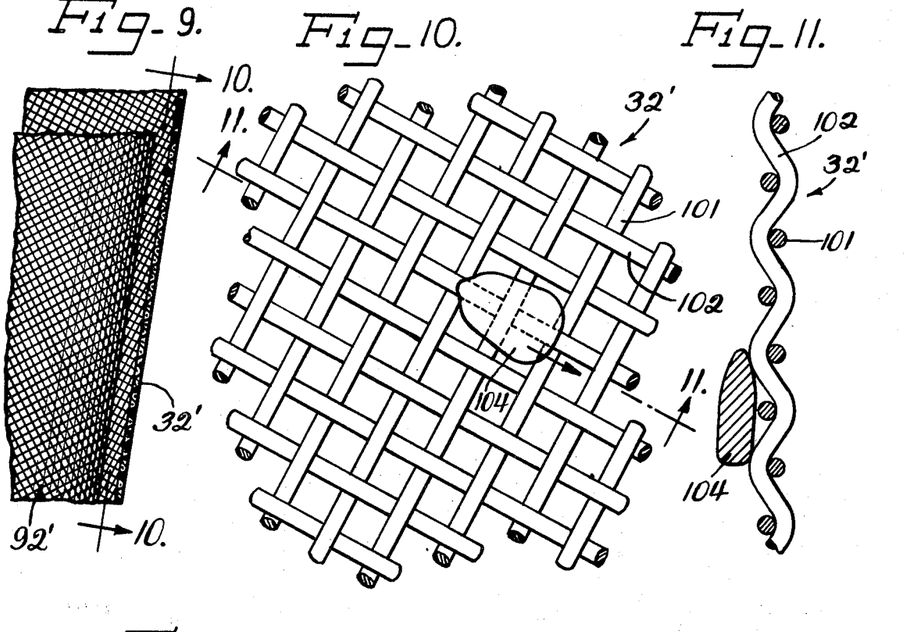
FIG. 9 is a fragmentary part side elevation, part section, similar to and on the same scale as FIG. 1, of the housing cone frustum and rotor of an apparatus that is constructed from open weave heavy wire mesh, in accordance with a modified embodiment of the invention.
FIG. 10 is a fragmentary section, on an enlarged scale, taken on the line 10—10 of FIG. 9, looking in the direction of the arrows, and showing a single corn kernel in a position through which it might well pass, in engagement with the surface of the cone frustum of the housing, during dehulling processing, with the direction of movement of the kernel being indicated by the arrow.
FIG. 11 is a section taken on the line 11—11 of FIG. 10, looking in the direction of the arrows.

For dehulling, an abrasive action is desired. The liner 40 of the cylindrical sleeve 38 exerts a scrubbing action on the kernel as the kernel passes over it. As shown in FIGS. 10 and 11, for dehulling the housing 32' has the wire bends disposed so that an abrasive action is developed by a kind of washboard action, as the kernel 104 slides over the wires with an apparent in and out type of motion.

OPERATION OF THE EQUIPMENT: IN GENERAL

The equipment is particularly useful for peeling (dehulling) cereal grain such as, for example, yellow dent corn, or high lysine corn, which is a floury type of corn. It is also useful for peeling oil-bearing seeds such as, for example, sunflower seeds. It is also useful for peeling sorghum. For all these operations, obviously, machine adjustments and operating adjustments must be made to achieve optimum performance.

The equipment also is useful for degerminating cereal grains, particularly artificially dried yellow dent corn, which is highly stressed and checked, and, as well, other types of corn such as, for example, high lysine corn.

DEHULLING

To use the equipment for dehulling corn, the corn kernels preferably are immersed for a short period of time in a warm solution of dilute caustic, or are moistened in some other way, to loosen the pericarp. The corn kernels are then fed promptly into the machine, which is operated at a relatively low rate of rotation of the rotary assembly 35, generally sufficient to impart to the corn kernels a "release" speed, that is, a speed at the time of leaving the impeller, in the range from about 1,000 to 5,000 fpm or less. The clearance in the annular abrasion channel 36 is about one inch or less, and generally, in the range from about three-fourths inch to about 1 inch.

The corn kernels are fed through the supply chute 68, and pass through the channel 65, into the bore 63 of the plate 48. They spread about the belled-out lower end 49 of the hub 46, onto the impeller. As the kernels are distributed upon the central section of the impeller, they immediately are distributed in substantially even fashion between the impeller vanes. Since the center section of the impeller has a relatively small volume compared to the peripheral portion of the impeller, the impeller can be said always to operate in "open" condition as compared to "flooded" condition.

The impeller distributes the corn and gets it located in a substantially uniform distribution about the periphery of the impeller, as it leaves the impeller. The surface of the liner of the cylindrical sleeve provides a desired kind of surface against which the corn can impact. For dehulling, it is a surface that provides an abrasive or scuffing action as the corn kernels move over it. It also aligns the kernels for entry into the clearance channel.

The volume or clearance between the vane tips of the impeller and the impact surface should be at least 50 percent greater in size than the available volume at the impeller entrance, for good operation. Generally, best results are obtained when the ratio of these two volumes falls in the range from 1.5 to 1 to about 2.5 to 1.

The corn kernels tend to slide along the surface of each impeller vane. If the rate of feed is low, each kernel will tend to engage directly against the vane surface. If the rate of feed is high, the layer of corn kernels on the surface of each vane may be more than one kernel deep. The kernels gather increasing speed as they move outwardly of the impeller. When they leave the impeller vane, each corn kernel tends to be moving in a direction that is tangential to the surface of the impeller vane at its distal end. Each kernel then traverses the distance between the distal end of its impeller vane and the rubber lining 40 of the cylindrical sleeve 38, and impacts against the rubber lining 40. The severity of the impact is determined by the speed of rotation of the impeller and the characteristics of the lining 40.

With proper control of machine operating conditions, the impact and other processing conditions can be adjusted so that there is a substantially clean separation of the hull from the internal portion of the corn kernel. The corn material spirals downwardly into the clearance channel 36, and is acted on by two forces within the channel. Gravity tends to cause the impacted material to drop downwardly, and the rotary forces generated by the rotor tend to drag the material through a circular path. The net effect is that the corn material moves through the clearance channel 36 in something approximating a spiral path. The movement of the kernels is such that an abrasive action is obtained between the kernels and the abrasive lining 31 of the housing cone frustum 32. The severity of the abrasive action can be adjusted for a particular shaft speed by raising or lowering the housing assembly by operating the cranks 47.

When artificially dried yellow dent corn is dehulled or peeled in this manner, the preliminary immersion in dilute lye preferably is for a period not in excess of about 30 minutes, at a temperature not in excess of 140°F, and at a concentration of sodium hydroxide up to about 1 percent by weight. This treatment is just sufficient slightly to lossen the pericarp. Very good separations of the hulls from the remainder of the kernels are then obtained when the impeller speed is such as to discharge the kernels at speeds in the range from about 2,000 feet per minute to about 5,000 feet per minute, against a hard rubber lining. Low stressed corn is desirable for effective mechanical peeling so as to minimize grain breakage.

DEGERMINATION

To use the machine for corn degermination, a thorough preliminary loosening of the pericarp with caustic is not necessary. However, usually a slight surface wetting is beneficial. This can be accomplished by moistening the corn kernels with 2 percent or less by weight of plain water. For good results, corn at about 15 to 16 percent equilibrium moisture (wet basis) can be sprayed or otherwise moistened with about 2 percent additional moisture. The moist kernels preferably are then held for a short period of time, such as a few minutes to an hour. Effective low moisture degermination is also obtainable when no surface wetting is used but at a reduction in quantity of free pericarp produced.

This slight surface wetting appears to toughen the pericarp and permits better partial pericarp release, i.e., the removal process seems to be easier, and the pericarp pieces removed are larger. This promotes easier and better germ release at the time of initial impact, and apparently promotes easier and better germ release as the corn is spiralled through the clearance channel.

The impeller speed is adjusted to a sufficiently high rotary speed so that the material that is being processed leaves the impeller at a speed in the range from about 5,000 feet per minute to about 15,000 to 20,000 feet per minute, for impacting or abrading against the lining of the cylindrical sleeve, which preferably is formed of metal for the degerminating operation. Based on observation of the machine during trial demonstrations for degerminating corn, it appears that the kind of action that is desired is an abrasive action, following the initial impact, and occurring while the corn kernel is moving over the surface of the sleeve prior to passing into the clearance channel, where the successive impacts occur that cause degermination. The sleeve surface preferably, therefore, is slightly rough, and a sprayed metal surface has been found to give good results. The subsequent impacting and abrasive action in the clearance channel effects a further release of germ, so that the product that is obtained includes a very substantial proportion of intact germs and grits that are relatively free of pericarp.

The generally conical shapes of the rotor and housing produce a unique kind of action. The rotor has a linearly declining peripheral speed from the entrance of the channel, at its upper end, to the discharge from the channel, at its lower end, or in other words, from the top of the rotor to the bottom of the rotor. The result is that there is an initial relatively harsh action on the material that is being processed, because of the relatively high rate of rotation near the channel entrance. As the material passes progressively farther down through the channel, the rotor's peripheral speed decreases and therefore produces a relatively less harsh action, but the volume is decreased so that there is a greater amount of material, per cubic inch of clearance channel, at the lower end of the clearance channel than at the upper end. This in turn has an effect on the kind of action that is obtained, with the least force being applied to the kernels at the point where the least force is needed, that is, adjacent the discharge opening.

The invention will now be further described and demonstrated in the following specific examples of the use of the equipment for dehulling and degerminating. These examples are merely illustrative and are not intended to limit the invention in any way. All parts and percentages are by weight unless otherwise specified. The term "mesh" is used to refer to U. S. Standard sieve sizes. Exemplary dimensions are:

| | |
|---|---|
| overs, 4 mesh | 4,760 microns or larger |
| through, 4 mesh | 4,760 microns or smaller |
| overs, 6 mesh | 3,360 microns or larger |
| overs, 25 mesh | 707 microns or larger |

EXAMPLE I

Peeling artificially Dried Yellow Dent Corn

For this demonstration of the invention, 400 pounds of artificially dried yellow dent corn were removed from the feed supply of a conventional wet milling plant. Upon examination, the corn kernels were found to be highly stressed and checked, as would be expected for artificially dried corn.

The corn was immersed in a solution of sodium hydroxide at a concentration of 0.76 grams of NaOH per 100 ml. (pH 12) for 30 minutes at a temperature of 130°F. The corn was then processed in a piece of equipment constructed in accordance with one embodiment of this invention immediately upon removal from the caustic solution, while still wet.

The particular piece of equipment had an impeller 14 inches in diameter. The impeller tip speed was about 3,600 fpm. The cylindrical sleeve was lined with hard rubber. Both conical surfaces were formed of woven wire (double crimped 4 mesh wire having 1/16 inch wire diameter). Both conical surfaces were inclined about 10° to the vertical. The clearance channel was about one inch across.

The corn kernels were fed into the impeller as fast as they would enter the supply chute. The material discharged from the lower end of the equipment was recovered. The pericarp fraction was separated by aspiration, and the remainder was screened. The product fell into the following categories:

TABLE 1

| Fraction | Yield, % |
|---|---|
| Whole peeled kernels (overs, 4 mesh screen) | 80 |
| Broken material (through 4 mesh screen) | 12 |
| Pericarp, by aspiration | 8 |

The separated pericarp fraction effectively concentrated the fiber fraction of the grain, so as to remove it from the process stream for further processing of the other material. This concentration of the fiber in the pericarp fraction permits the use of the fiber for livestock feed, as a source of hemicellulose, or as a source of furfural.

Similarly, removal of the pericarp permits more efficient degermination of the other fractions, using dry or semi-dry milling methods. It also reduces the amount of water required for processing, made necessary in the past by prior art fiber separation techniques. Similarly, the process and equipment of the present invention reduces the amount of equipment, and therefore the capital investment, presently required for the fiber, starch, and protein separation steps in both the wet and dry milling processes.

The versatility of the equipment will now be demonstrated by a description of its use for degerminating.

EXAMPLE II

Degerminating Dried Yellow Dent Corn

Degermination is the key operation in the dry milling process. It usually is done on a machine that is known in the industry as a Beall degerminator. It produces two distinct streams of product material. The large particles that come out of the tail of the degerminator are called tail stock or hominy stock. This is the material that will provide large hominy grits for cereal flaking. The finer particles of broken corn and germ are called Thru Stock.

Ordinarily, before corn is supplied to a Beall degerminator, it is conditioned by the addition of hot or cold water and steam, either separately or in combination. Corn usually is tempered by raising its moisture content from the normal level of 14 to 18 percent, for artificially dried corn, to from 22 to 25 percent. The increased moisture content is necessary for effective processing in the Beall degerminator. Unfortunately, in order for the stock material from the Beall degerminator to be processed further efficiently, it is necessary to reduce the moisture content to 15 to 16 percent by drying. Ordinarily, this is accomplished on conventional rotary steam tube driers, with subsequent cooling, sifting, and classifying.

For comparative purposes, a series of 24 separate degermination operations were conducted on a Beall degerminator. The observations that were made were recorded, and averaged. The data are summarized below in Table 2.

Table 2: Beall Degerminator Data Yellow Dent Corn (Using 22% to 25% Equilibrium Moisture Grain)

| Particle Size Range of Processed Material | Weight (%) | Oil Content of Fraction (%) | Oil Content of Fraction Expressed as % of Total Oil in Grain | Oil Contributed by Free Germ in Sized Fraction Expressed as % of Total Germ Oil |
|---|---|---|---|---|
| Large grits and germ: −4 mesh +6 mesh | 40.0 )78 | 4.6 | 75.5 | 67.9 |
| Intermediate fraction: −6 mesh +25 mesh | 38.0) | | | |
| Fines: −25 mesh | 13.7 | 3.0 | 8.1 | |

A piece of equipment constructed in accordance with another embodiment of the present invention was then employed for degerminating. In this equipment, the lining of the cylindrical sleeve, in the housing, was a layer of hard rubber. The housing and the rotor were made of double crimped 4 mesh wire having 1/16 inch wire thickness (diameter). The impeller diameter was 14 inches. The rotor was driven at 1,600 rpm. The feed stock was artificially dried yellow dent corn taken from the feed supply of a conventional wet milling plant. It contained 16 percent equilibrium moisture. It was surface wet by spraying with 2 percent by weight water, and then was fed directly into the machine. The material discharged from the machine was recovered, sifted, and classified. The observations are recorded below in Table 3.

Table 3: Present Process Data Yellow Dent Corn (Using 16% Equilibrium Moisture Corn)

| Particle Size Range of Processed Material | Weight (%) | Oil Content of Fraction (%) | Oil Content of Fraction Expressed as % of Total Oil in Grain | Oil Contributed by Free Germ in Sized Fraction Expressed as % of Total Germ Oil |
|---|---|---|---|---|
| Large grits and germ: −4 mesh +6 mesh | 67.7 )90.1 | 6.1 )5.3 | 82.7 )95.7 | 83.3 )91.9 |
| Intermediate fraction: −6 mesh +25 mesh | 21.4 | 3.1 | 13.0 | 8.6 |
| Fines: −25 mesh | 5.7 | 1.7 | 1.8 | |

A comparison of the data in Tables 2 and 3 makes several interesting factors apparent. First, the process of the present invention produced more large grits and germ than did the Beall degerminator, namely, 67.7 percent for the present process as compared to 40.0 percent for the Beall process. Moreover, the large grits and germ fraction produced by the process of the present invention contained 83.3 percent of the original germ oil. In contrast, the stock produced from the Beall degerminator contained much less of the original oil. In fact, when the large grits and germ fraction from the Beall degerminator was combined with the intermediate fraction, these combined fractions were found to contain only 67.9 percent by weight of the original germ oil, as compared with 91.9 percent for the combined fractions produced by the process of the present invention.

Another significant factor is that the process of the present invention not only liberated the germ in very large proportion, namely, 83.3 percent of the germ in the large grits and germ fraction, but this liberated germ was present in large particle size. Inspection revealed that this fraction contained primarily whole, free germ. Accordingly, the germ in this fraction was readily separable from the endosperm, permitting a minimum amount of further processing by dry milling separation techniques.

In addition to these very substantial advantages, the material processed in accordance with the present invention did not require drying. This represents a very substantial process saving.

The process of the invention was further demonstrated in connection with a floury type corn (high lysine), as described below in Example III.

EXAMPLE III

Degerminating High Lysine Corn

The processing techniques used in Example II were generally followed. Floury type corn is low in horny endosperm, and it is difficult to perform an effective degermination on this type of corn by conventional techniques. However, this kind of corn, dried to a moisture content of 16 percent, was processed in accordance with the present invention. The processed material was recovered, sifted, and classified. The data are recorded below in Table 4.

Table 4: Present Process Data Floury Type Corn

| Particle Size Range of Processed Material | Weight (%) | Oil Content of Fraction (%) | Oil Content of Fraction Expressed as % of Total Oil in Grain | Oil Contributed by Free Germ in Sized Fraction Expressed as % of Total Germ Oil |
|---|---|---|---|---|
| Large grits and germ: −4 mesh +6 mesh | 40.0) )79.1 | 10.3) )6.0 | 81.7) )94.1 | 88.8) )95.2 |
| Intermediate fraction: −6 mesh +25 mesh | 39.1) | 1.6) | 12.4) | 6.4) |
| Fines: −25 mesh | 15.4 | 1.0 | 3.0 | |

As can be seen from the data, excellent germ release was obtained. The coarse fraction of large grits and germ contains 40 percent of the total weight of the material, but this fraction alone contained 88.8 percent of the original germ oil. This fraction consisted primarily of whole free germ.

The excellent germ release also is demonstrated by the very low oil content, 1.6 percent, in the intermediate fraction. While an increase in the quantity of the fines fraction would be expected because of the use of floury type corn as the material being processed, as compared to yellow dent corn, nevertheless the oil content is extremely low, despite the much larger quantity of the fines fraction.

ADVANTAGES IN THE PRESENT INVENTION

The present invention offers many advantages. One of these is the opportunity to process corn by what is essentially a dry milling technique, with a more quantitative component separation with respect to pericarp (fiber) removal and degermination. Another advantage, of considerable practical significance, is the opportunity to improve the wet milling process by eliminating the need for or reducing the amount of water that is currently needed for steeping and fiber separation, and eliminating completely the energy that is now required for drying. Another advantage is the reduction in the need for capital investment and equipment presently required for starch-fiber separation in wet milling operations.

As to the equipment itself, its design offers several advantageous and convenient features. It is sufficiently versatile by reason of the use of a variable speed drive and an adjustable channel to permit its use with substantially any kind of cereal grain as a feed material that is to be processed. Thus, by simply adjusting operating conditions of the equipment, it is possible to process such remarkably different materials as, for example, corn, sunflower seeds, and sorghum.

GENERAL

Several embodiments of the equipment of the invention have been described to illustrate the operating principles that have been found to be effective. Many modifications of these specific embodiments are feasible in accordance with these principles.

For example, the rotor and housing have been described as having similar inclinations to the vertical. Generally, good results can be obtained when the inclinations to the vertical are from about 5° to about 45°, or, preferably, from about 5° to about 20°. Moreover, the inclinations of the two conical surfaces need not be the same.

Obviously, if the inclination is too small, then the material may tend to drop through the clearance channel too rapidly, depending somewhat on the lengths (heights) of the rotor and housing. When the inclination to the vertical is within or close to the preferred range from 5° to 20°, the lengths of the rotor and housing preferably are such that the area of the discharge annulus is just about equal to the area of the channel entrance annulus, that is, the annulus between the hub 46 and an imaginary cylindrical surface in which fall the inner ends of the vanes 44.

The rotor or housing surface, or both, can be formed in many ways other than those specifically described and illustrated herein, to perform their functions. For example, the rotor may be formed from sheet metal. Small cylindrical rods (3/16 inch diameter) are welded to this surface. Each rod is in an upright position, that is, it is coplanar with the axis of rotation of the rotor. A rotor made in this fashion, used in combination with a woven wire housing, was very effective for degermination. Alternatively, the rods may be disposed to follow helical paths.

CONCLUSION

While the invention has been described in connection with some specific embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the present invention.

I claim:

1. A method of processing a particulate agricultural raw material comprising discrete kernels of cereal or discrete seeds, that comprises:
   in a first, generally cylindrical zone that is disposed with an upright axis, supplying the particles generally axially of the zone to a central area thereof and then accelerating the particles generally horizontally and radially outwardly and permitting them to strike an impact surface and to undergo movement along that impact surface;
   dropping the impacted particles directly, by gravity, but with helically directed momentum initiated in said first zone, into a second zone that is contiguous with said first zone and disposed immediately therebelow, said second zone being defined by a pair of spaced, rough, confronting, truncated, individually downwardly converging conical surfaces, at least one of which is rotating relative to the other in a direction to continue the helical movement of the particles initiated in said first zone;

subjecting the particles to impact and to abrasion in said second zone as they drop downwardly between said conical surfaces and are impelled by contact with the rotary surface to move through a generally helical path, said conical surfaces being spaced a predetermined distance apart such that a given particle is contacted by only one of said surfaces at a given time;

discharging the processed particles from said second zone through an open annulus between said confronting surfaces; and recovering the processed particles for separation into components.

2. A process for dehulling in accordance with claim 1, wherein the particles are propelled against the impact surface in the first zone at a speed in the range from about 1,000 feet per minute to about 5,000 feet per minute and are subjected to abrasive action, during the processing, that removes the hulls.

3. A process in accordance with claim 1 for degerminating wherein the particles are propelled against the impact surface of the first zone at a speed in the range from about 5,000 feet per minute to about 20,000 feet per minute, and are subjected to a series of impacts during the processing, to liberate the germ portions.

4. A method for dehulling a particulate agricultural raw material consisting of discrete kernels of cereal or discrete seeds, that comprises:

subjecting the material to a preliminary aqueous treatment to loosen the hulls;

then, in a first, generally cylindrical zone that is disposed with an upright axis, supplying a stream of the particles generally axially of the zone to a central area thereof and then accelerating the particles generally horizontally and radially outwardly and permitting them to strike an impact surface and to undergo movement along that impact surface;

dropping the impacted particles directly, by gravity, but with helically directed momentum initiated in said first zone, into a second zone that is contiguous with said first zone and disposed immediately therebelow, said second zone being defined by a pair of spaced, rough, confronting, truncated, individually downwardly converging conical surfaces, at least one of which is rotating relative to the other in a direction to continue the helical movement of the particles initiated in said first zone;

subjecting the particles in said second zone to impact and to abrasion, with progressively milder abrading action as the particles drop downwardly between said conical surfaces and are impelled by contact with the rotary surface to move through a generally helical path, to effect substantially complete hull removal, said conical surfaces being spaced a predetermined distance apart such that a given particle is contacted by only one of said surfaces at a given time;

discharging the processed particles and removed hulls from said second zone through an open annulus between said confronting surfaces; and recovering the discharged material for separation into components.

5. A process in accordance with claim 4 wherein the aqueous treatment comprises immersing the raw material in dilute caustic at an elevated temperature for a short period of time, and wherein the impact velocity in the first zone is up to about 5,000 feet per minute.

6. A method for peeling artificially dried corn that comprises:

immersing the corn kernels for a short period of time in a dilute caustic solution, at an elevated temperature, to loosen the hulls;

then, in a first, generally cylindrical zone that is disposed with an upright axis, supplying the best treated corn kernels generally axially of the zone to a central area thereof and then accelerating the kernels generally horizontally and radially outwardly and permitting them to strike an impact surface at an impact speed up to about 5,000 feet per minute, in a direction to cause the kernels to move along that surface;

dropping the impacted kernels directly, by gravity, but with helically directed momentum initiated in said first zone, into a second zone that is contiguous with said first zone and disposed immediately therebelow, said second zone being defined by a pair of spaced, rough, confronting, truncated, individually downwardly converging conical surfaces, at least one of which is rotating relative to the other in a direction to continue the helical movement of the kernels initiated in said first zone;

subjecting the kernels to impact and to abrasion in said second zone as they drop downwardly between said conical surfaces and are impelled by contact with the rotary surface to move through a generally helical path, with the abrading action being progressively milder as the kernels pass through said second zone by reason of the progressively decreasing relative speeds between said confronting surfaces throughout said second zone, to effect substantially complete hull removal, said conical surfaces being spaced a predetermined distance apart such a given kernel is contacted by only one of said surfaces at a given time;

discharging the processed kernels and hulls from said second zone through an open annulus between said confronting surfaces, and recovering the processed material for separation into components.

7. A method in accordance with claim 6 wherein the corn is artificially dried yellow dent corn and wherein the corn kernels are propelled against the impact surface of the first zone at a speed in the range from about 1,000 feet per minute up to about 5,000 feet per minute.

8. A method for degerminating kernels of dried corn comprising:

in a first, generally cylindrical zone that is disposed with an upright axis, supplying a stream of the corn kernels generally axially of the zone to a central area thereof and then accelerating the corn kernels generally horizontally and radially outwardly and permitting them to strike an impact surface at a speed in the range from about 5,000 feet per minute to about 20,000 feet per minute to cause them to fracture and to undergo movement along that impact surface, while releasing a portion of the germ substantially intact;

dropping the impacted kernels directly, by gravity, but with helically directed momentum initiated in said first zone, into a second zone that is contiguous with said first zone and disposed immediately therebelow, said second zone being defined by a pair of spaced, rough, confronting, truncated, individually downwardly converging conical surfaces, at least one of which is rotating relative to the other in a direction to continue the helical movement of the kernels initiated in said first zone;

subjecting the kernels to further successive impacts in said second zone as it drops downwardly between said conical surfaces and is impelled by contact with the rotary surface to move through a generally helical path, said conical surfaces being spaced a predetermined distance apart such a given kernel is contacted by only one of said surfaces at a given time;

discharging the processed material from said second zone through an open annulus between said confronting surfaces; and recovering the processed material for separation into components.

9. A process in accordance with claim 8 wherein the dried corn is artificially dried yellow dent corn.

* * * * *